United States Patent [19]
Baer

[11] Patent Number: 5,860,509
[45] Date of Patent: Jan. 19, 1999

[54] CONVEYOR BELT SYSTEM

[75] Inventor: Manfred Baer, Vöhrenbach, Germany

[73] Assignee: IWB Industrietechnik GmbH, Germany

[21] Appl. No.: 915,426

[22] Filed: Aug. 20, 1997

Related U.S. Application Data

[63] Continuation of Ser. No. 695,969, Aug. 13, 1996, abandoned, and a continuation of Ser. No. 271,116, Jul. 6, 1994, abandoned.

[30] Foreign Application Priority Data

Jul. 6, 1993 [DE] Germany .......................... 43 22 403.2

[51] Int. Cl.⁶ .................................................. B65G 15/00
[52] U.S. Cl. ............................................................ 198/809
[58] Field of Search ................................................ 198/809

[56] References Cited

U.S. PATENT DOCUMENTS

| | | | |
|---|---|---|---|
| 3,252,563 | 5/1966 | Juengel | 198/809 |
| 3,620,353 | 11/1971 | Foster et al. | 198/809 |
| 3,934,707 | 1/1976 | Bowman | 198/809 X |
| 3,951,254 | 4/1976 | Juhrend | 198/809 |
| 4,238,026 | 12/1980 | Mrugala et al. | 198/809 X |

FOREIGN PATENT DOCUMENTS

| | | | |
|---|---|---|---|
| 0358254 | 3/1990 | European Pat. Off. | 198/809 |
| 2727638 | 12/1978 | Germany | 198/809 |
| 3134372 | 6/1983 | Germany | 198/809 |
| 62-0145018 | 7/1986 | Japan | 198/809 |
| 7903711 | 11/1980 | Netherlands | 198/809 |

*Primary Examiner*—D. Glenn Dayoan
*Attorney, Agent, or Firm*—Pendorf & Cutliff

[57] ABSTRACT

A conveyor belt system for intermittently controllably transporting and arresting workpieces. The belt band of a conveyor belt runs between two upward facing shanks of an H-profile track. The conveyor belt is either actively or passively lowered in the area of the appropriate work station so that a workpiece carrier comes to rest on the U-shaped ends of a base support with positional exactness. During working on the workpiece, the belt band runs through underneath the workpiece carrier. The forces resulting from working on the piece are taken up by the two U-shaped ends of the base support. For the further transport of the workpiece carrier the belt band of the conveyor belt is again raised to contact the work piece carrier.

10 Claims, 5 Drawing Sheets

CONVEYOR BELT SYSTEM

This is a continuation of application Ser. No. 08/696,969 filed Aug. 13, 1996, now abandoned which is a continuation of application Ser. No. 08/271,116 filed Jul. 6, 1994, entitled "CONVEYOR BELT SYSTEM" now abandoned.

BACKGROUND OF THE INVENTION

1. Field of the Invention

The invention concerns a conveyor belt system for intermittently controllably transporting and arresting goods, so that work can be performed on the transported goods without damage to the conveyor belt.

2. Description of the Related Art

For the transport and positioning of work pieces conveyor belt systems are frequently used in modern assembly technology. Since the processing of work pieces is normally done at rest, the work pieces carriers, on which the work pieces are carried, are removed from the conveyor belt at the appropriate work station.

From DE-PS 38 32 845 there is known an assembly station with a positioning- and stop-arrangement. In this arrangement the work piece carrier is lifted off the conveyor belt and the stop arrangement is correspondingly loaded during the working processing of the work piece.

If the work takes place on the halted conveyor belt without lifting off the work piece carrier, abrasion and wearing can appear after many insertion, pressing in, or other operations. The conveyor belt must thus be so constructed as to be able to tolerate such pressure loads.

From CH 669 167 A5 a conveyor belt device is known in which the work piece carrier is with frictional engagement taken along a train drawgear. Upon stopping of the workpiece carrier the frictional engagement remains intact.

From DE-AS 26 44 240 is known the original generic gathering conveyor, in which a laterally driven apron or slat conveyor circulates disposed between two conveyor surfaces. The conveying surfaces are respectively formed of multiple, successive rollers. The apron or slat conveyor can in sections be raised by means of lift tracks. In the raised condition the slat conveyor contacts with the under side of the goods to be transported. Thereby there is effected the conveyance of the goods. In the lowered condition no contact is made between the slat conveyor and the goods to be transported. The slat conveyor runs freely passing underneath the goods to be transported. The lift tracks are pneumatically raised and lowered by means of inflatable airsacks. The goods to be transported rest during transport simultaneously on both the slat conveyor and on the rollers. Upon lowering of the slat band the goods to be transported can roll on.

From DE 38 32 465 A1 a conveyor system is known for loading and unloading of automobiles. The conveyor system is built on an H-shaped profile track.

SUMMARY OF THE INVENTION

The present invention is concerned with a conveyor belt system, in particular for a conveyor belt with work stations, for transport of goods to be transported, which in a first setting of a lift device frictionally contacts and is transported and in a second setting lies upon an adjacent to the belt associated rest surface, in which a loading of the conveyor system is avoided during the working process and with which the positioning a work piece can be controlled with positional precision.

The problem is solved by means of a conveyor belt system for intermittently transporting and arresting goods, comprising a continuous conveyor belt band; an H-profile track comprising two upward facing shanks and a central fixed member, said upward facing shanks having upper surfaces adapted for engagement with the lower surface of a goods carrier; a conveyor belt band carrier positioned between said upward facing shanks of said H-profile track, said conveyor belt band carrier carrying and guiding said conveyor belt band; a lift device for vertically displacing said conveyor belt band carrier between a raised and a lowered position, said lift device disposed between said central fixed member of said H-profile track and said conveyor belt band carrier; and a goods carrier provided on said conveyor belt; wherein said goods carrier is in frictional engagement with said conveyor belt band when said conveyor belt band carrier is displaced in the raised position, and wherein said goods carrier rests upon the upper surfaces of said upward facing shanks when the conveyor belt band carrier is displaced in the lower position.

The fundamental idea of the invention resides therein, to either actively or passively lower the conveyor belt at the appropriate work station so that the work piece carrier comes to rest on a base support with positional exactness and thereby a working of the work piece without or, as the case may be, with minimal loading of the conveyor belt and minimal tolerance is possible. For the further transport of the work piece carrier the conveyor belt is again raised.

Advantageous further developments of the invention can be seen in the dependent claims.

BRIEF DESCRIPTION OF THE DRAWING

In the following the invention is described with reference to three illustrative embodiments, which are shown in the drawings. There are shown.

DETAILED DESCRIPTION OF THE INVENTION

Figure 1:
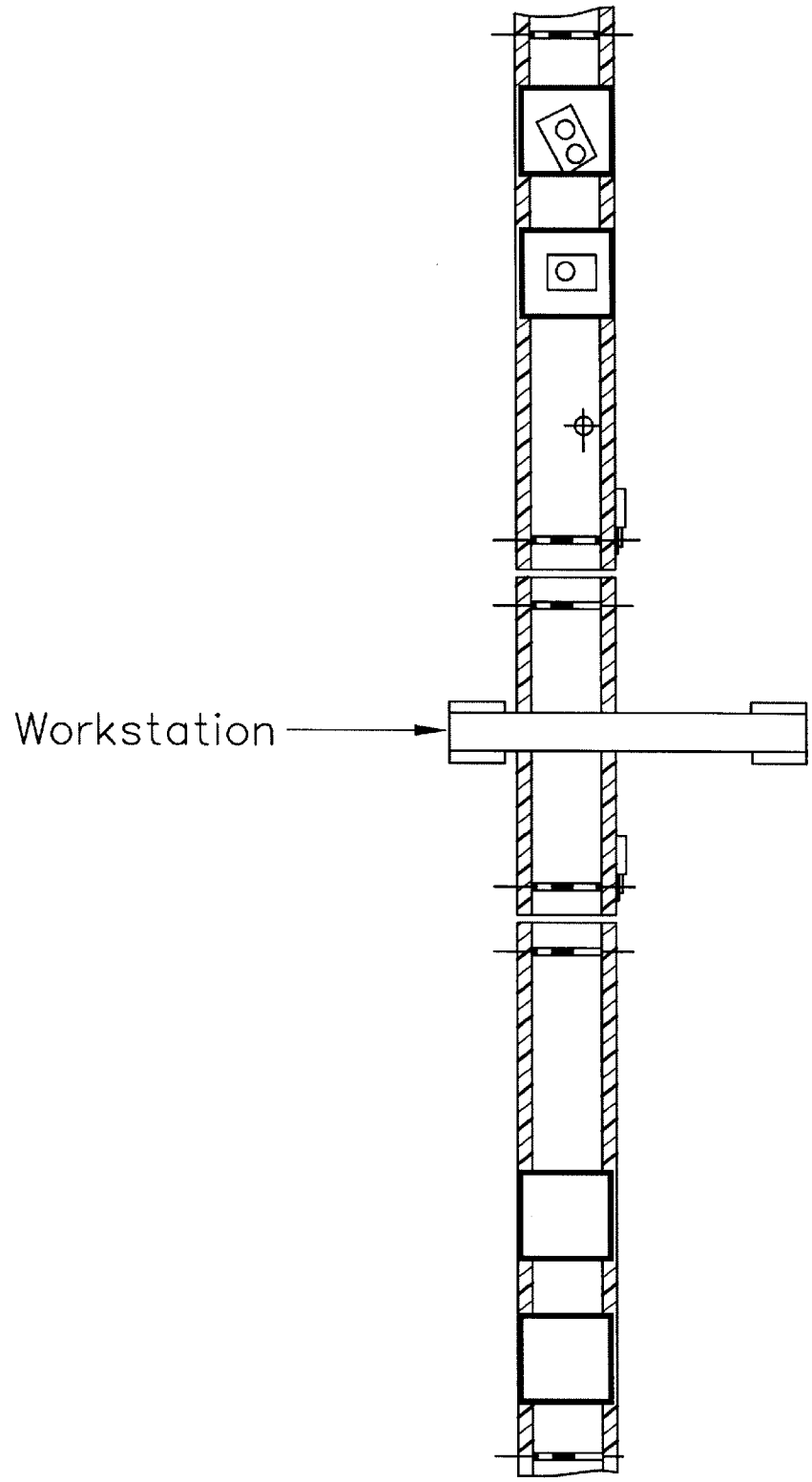
FIG. 1 top view of a conveyor belt system.

FIG. 1 shows a top view of a conveyor belt system. Separate work pieces are guided on work piece carriers to various work stations. The controlling of the conveyor belt system is accomplished by means of a computer, which is connected via a bus system with the various drivers and sensors.

Figure 2:
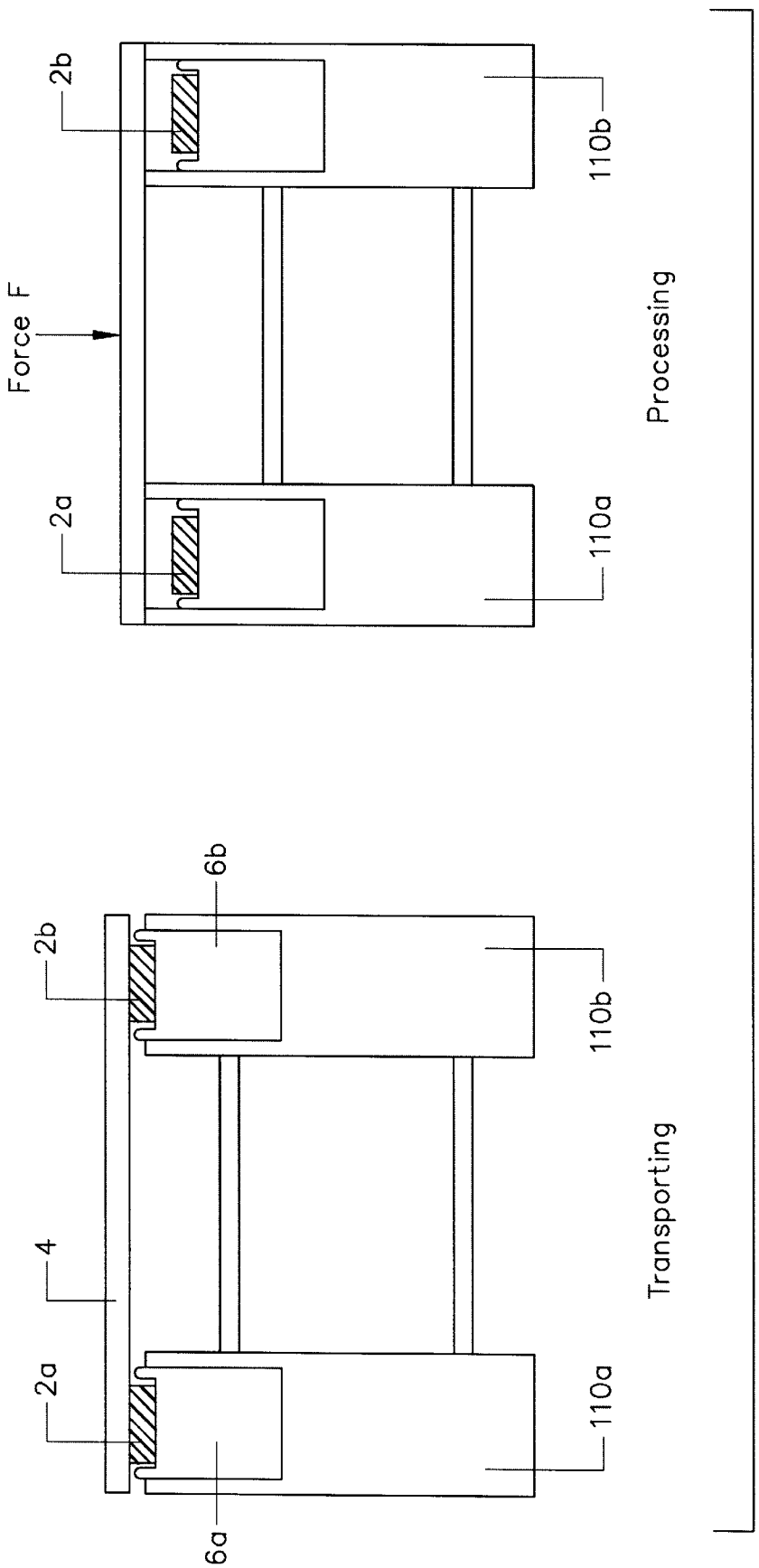
FIG. 2 schematic cross sectional representation of a work station of a conveyor belt system with raised and lowered conveyor belt, FIG. 3a,b section perpendicular to the transport direction through a conveyor belt system at a work station with a lift cylinder with raised or as the case may be lowered conveyor belt according to a first embodiment, FIG. 4a,b section according to FIG. 1 according to a second embodiment provided with springs and FIG. 5a,b section according to FIG. 1 according to a third embodiment provided with pressure hose.

FIG. 2 shows a schematic cross-sectional representation at a work station of a conveyor belt system with raised and lowered conveyor belt (FIG. 2). During transport the work piece carrier 4 rests frictionally upon the two belt bands 2a,b. The two belt band carriers 6a and 6b are raised in the respective supports 110a,b. For working, the two belt bands 2a,b are lowered so far, that the work piece carrier rests upon the U-shaped ends of the supports 110a,b. The two belt bands 2a,b run through underneath the workpiece carrier 4.

The forces resulting from working on the piece are taken up by the two supports 110a,b.

Figure 3A:
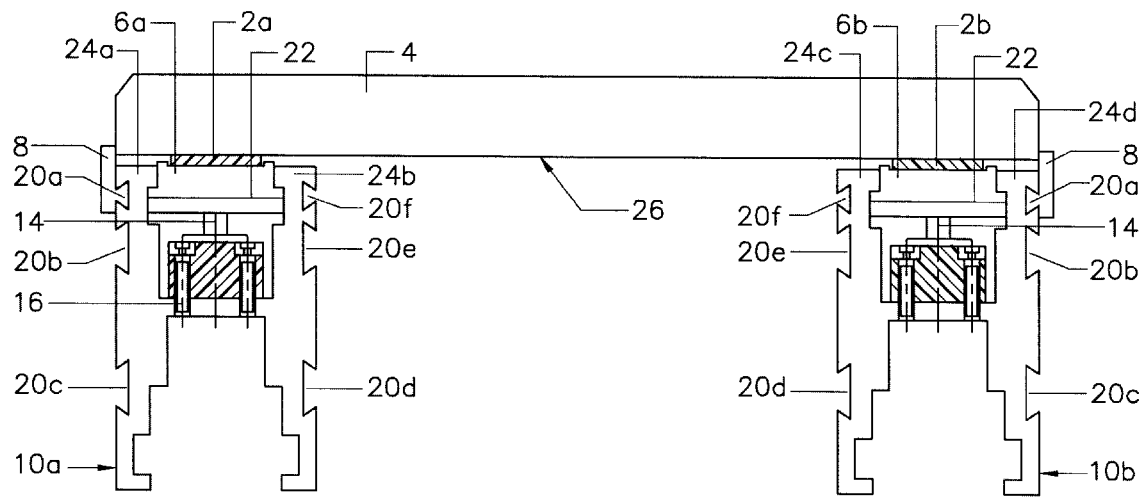
Figure 3B:
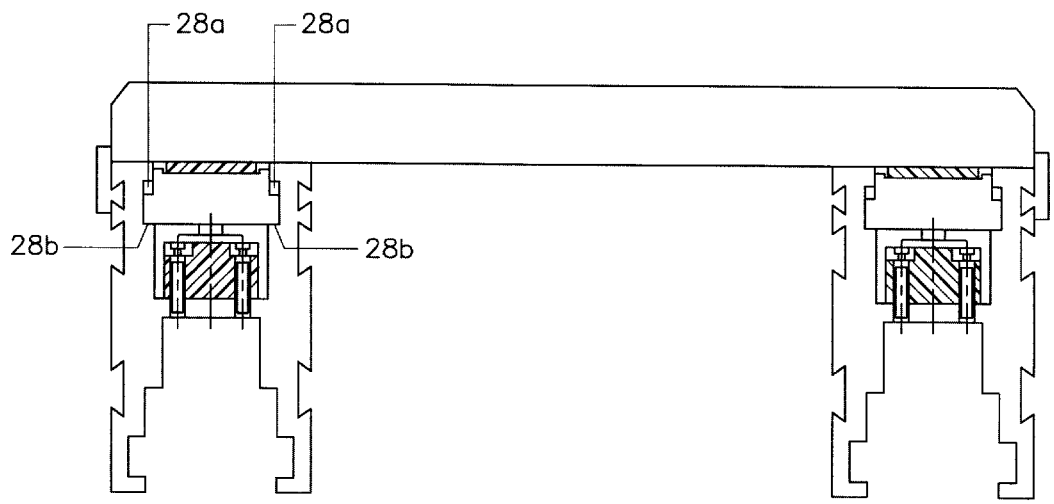
Figure 4A:
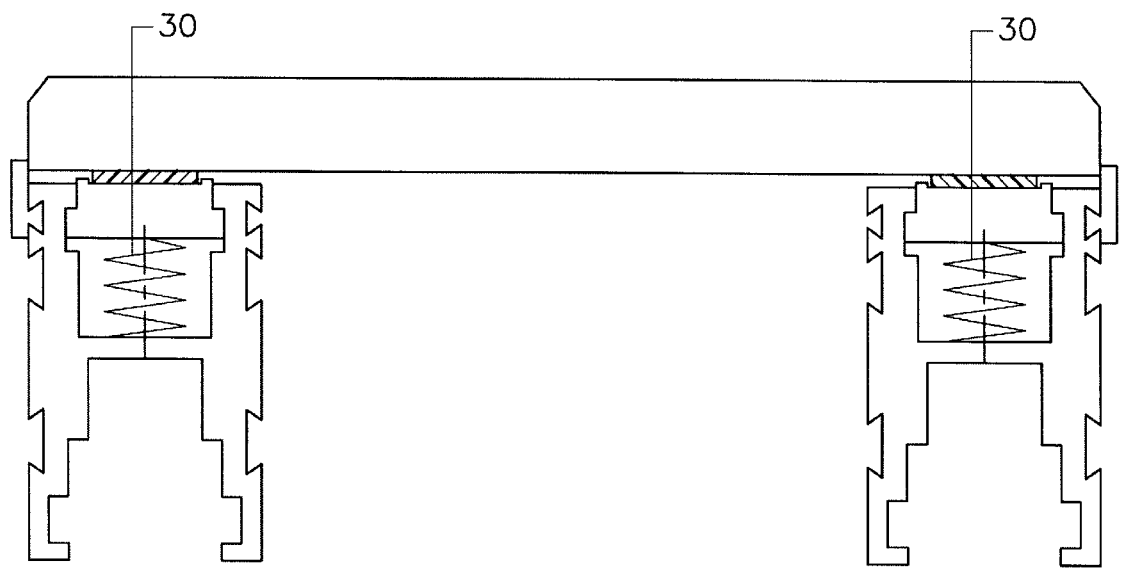
Figure 4B:
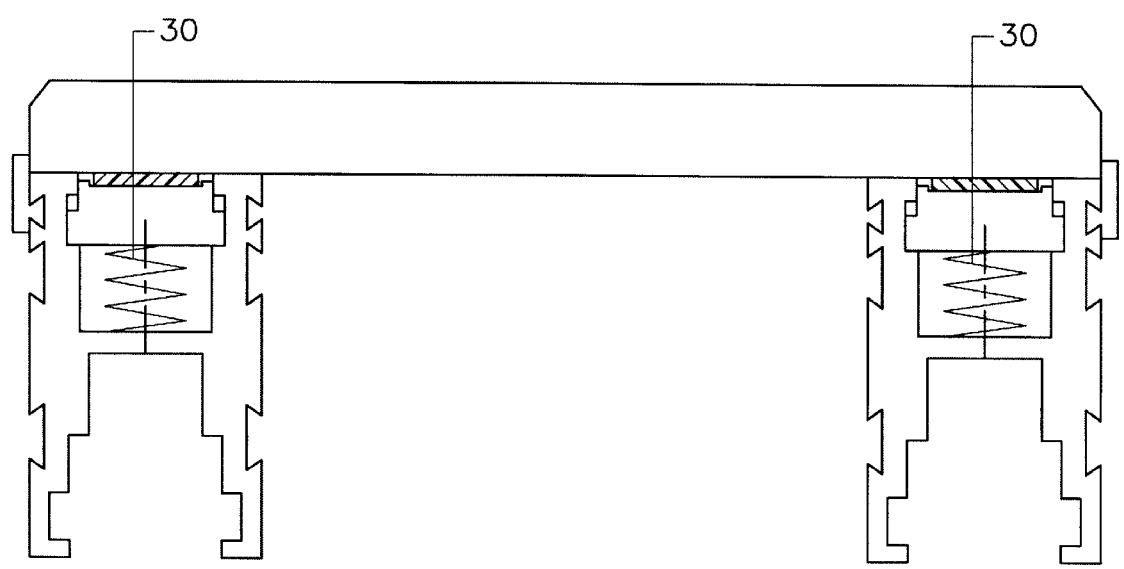
Figure 5A:
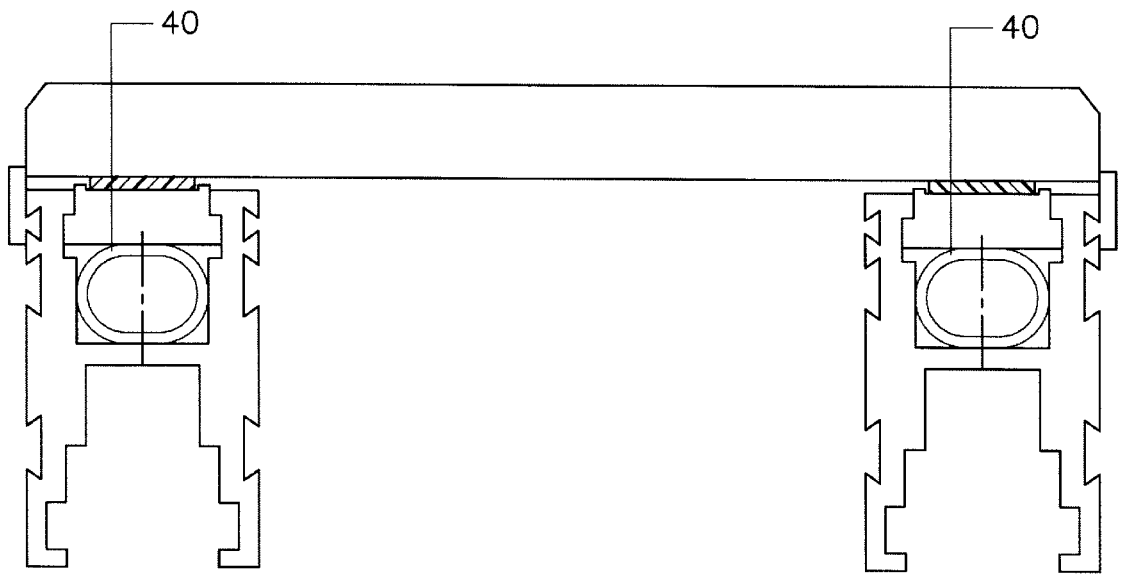
Figure 5B:
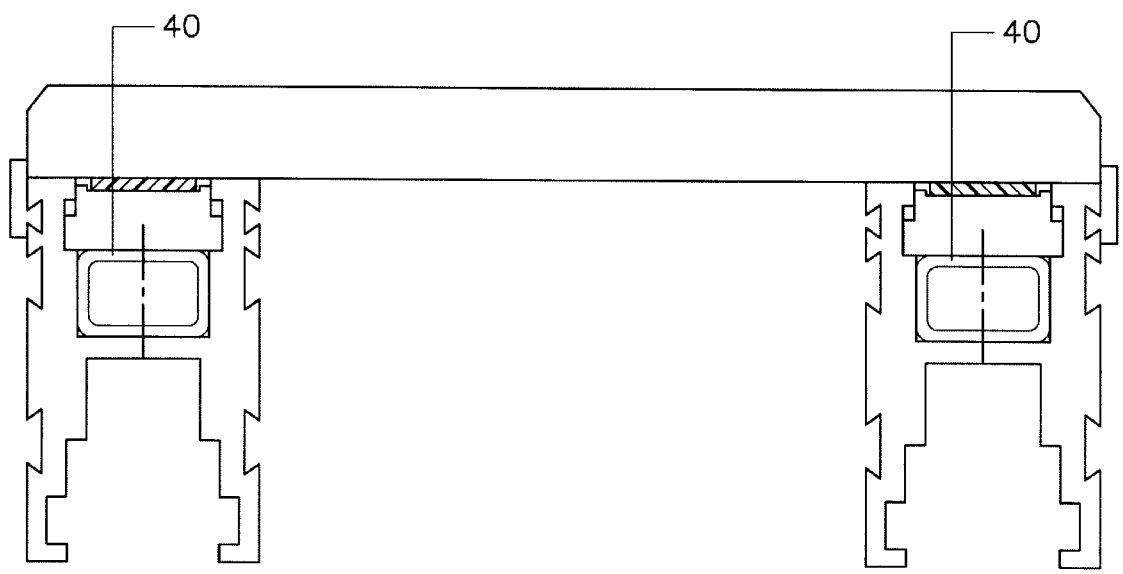

The conveyor belt systems shown in FIG. 1–5 are concerned with the type of belt conveyor systems with two parallel next to each other running belt conveyors, so called double belt conveyor systems. Two H-profile tracks 10a,b are associated with one of the carriers not shown in drawings (FIG. 3). They serve as supports for the workpiece carrier 4. The workpiece carrier 4 lies with its bottom surface 26 on the two belt bands 2a,b (FIG. 3b). The two belt bands 2a,b are respectively guided in belt band carriers 6a,b. The belt band carriers are in recesses 22 vertically displaceable limited by the stops 28a or 28b. The displacement is accomplished in a pressure cylinder 14 by means of a pressure cylinder driver 16. The pressure cylinder driver 16 is seated on a central fixed member 12 of the H-profile track 10a or 10b. The sideways guidance of the work piece carrier is accomplished respectively by means of two side guides 8, which are retained in the sideways dovetail grooves 20a. The H-profile tracks 10a,b are provided with further dovetail grooves 20b–f, which serve for the securing of various additional elements.

In place of the raising of the conveyor belt band 2a,b with the help of a pressure cylinder means, it is possible to change the position using a spring 30 (FIG. 4a,b), with pressure hose 40 (FIG. 5a,b) or with an electromagnetic means 30. In the raising to the upper position with the help of a spring 30 the spring pressure is so adjusted, that it is just sufficient to raise the workpiece carrier together with workpiece. During the working the workpiece carrier 4 is subjected to a downward force which, when it exceeds a certain value, is sufficient to press the workpiece carrier 4 onto the support surfaces 24a–d. In this case the frictional engagement between the conveyor belt band 2a,b and the workpiece carrier 4 is insufficient to cause conveyance thereof. In this illustrative embodiment there is not the possibility of an active lowering or an active raising of the belt band carrier 6a,b. It is concerned with a passive lift system.

In a further illustrative embodiment the raising of the workpiece carrier is accomplished by means of a pressure hose 40. The pressure hose 40 lies on a middle piece 12 and is constrained sideways by the upper two shanks of the H-profile tracks 10a,b. In the turgid condition the pressure hose presses from underneath against the belt band carrier 6a,b. As a driver, a hydraulic or pneumatic means may be provided. With a pressure hose 40 an active as well as a passive raising of the workpiece carrier is made possible. In the first case the pressure in the pressure hose 40 is alternatively raised or lowered. In the second case the pressure is maintained constant and is so selected, that the workpiece carrier is raised with the workpiece.

In an embodiment not shown in the figures the raising of the two conveyor belt bands 6a,b is accomplished by means of two controllable electromagnets.

For the working of the workpiece the belt bands 2a,b are with the workpiece carrier 4 either actively or passively lowered, so that it with its bottom surface 26 rests on the support surfaces 24a,b,c,d (FIG. 1b, 2, 3b). The lowering is accomplished by means of a lift device 16, 30, 40. The workpiece carrier 4 rests thereby stably on the H-profile tracks 10a,b and the in the drawings not shown workpiece which rests thereon can be worked on. Upon the eventual loading of the workpiece carrier these forces are easily taken up by the two H-profile tracks. In this work setting of the workpiece carrier 4 the two conveyor belt bands 2a,b move through underneath the workpiece carrier 4. For a further conveying of the workpiece, or as the case may be, the workpiece carrier, the two belt band carriers 6a,b are again raised and thereby the belt band 2a or 2b is pressed against the underside of the workpiece carrier 4. The workpiece carrier 4 is then conveyed by the frictional engagement with the belt bands 2a,b.

A significant advantage of the invention resides therein, that the belt band during the processing of the workpiece is not, or is minimally, loaded, and need not be halted.

As further significant advantage it is to be noted, that the lowering of the belt band actively or passively is accomplished by means of a simple lifting device 16, 30, 40, and no costly displacement mechanism for the workpiece carrier is required. The energy requirements for the raising step can be adjusted to be so low, that the workpiece carrier together with the workpiece is only just carried. The lowering of the belt band 2a,b can in a desired place in the conveyor belt system comfortably and simply be accomplished, since the lift device 16, 30, 40 is easy to dismount and convert.

Now that the invention has been explained, what is claimed is:

1. A conveyor belt system for intermittently transporting and precisely arresting workpieces, comprising:

a continuous conveyor belt band;

an H-profile track comprising two upward facing shanks and a central fixed member, said upward facing shanks having upper surfaces adapted for engagement with the lower surface of a workpiece carrier;

a conveyor belt band carrier positioned between said upward facing shanks of said H-profile track, said conveyor belt band carrier carrying and guiding said conveyor belt band;

a lift device for vertically displacing said conveyor belt band carrier between a raised and a lowered position, said lift device disposed between said central fixed member of said H-profile track and said conveyor belt band carrier, wherein said lift device is a pressure hose lying on said central fixed member of said H-profile track and constrained between said two upward facing shanks of the H-profile track, such that inflation of said hose causes said hose to press from underneath against said conveyor belt band carrier and cause said conveyor belt to raise to a position for contacting a workpiece carrier;

a workpiece carrier provided on said conveyor belt; and two sidewalls connected to said upward facing shanks of said H-profile track for precise lateral guidance of the workpiece carrier;

wherein said workpiece carrier is in frictional engagement with said conveyor belt band when said conveyor belt band carrier is displaced in the raised position, and wherein said workpiece carrier rests upon the upper surfaces of said upward facing shanks when the conveyor belt band carrier is displaced in the lower position.

2. A conveyor belt system as in claim 1, wherein said H-profile track is constructed of aluminum or aluminum alloy.

3. A conveyor belt system as in claim 1, wherein said lifting device comprises a controllable pressure cylinder driver and a pressure cylinder.

4. A conveyor belt system as in claim 1, wherein said lifting device comprises a resilient spring means having a spring pressure sufficient for raising said workpiece carrier and workpieces provided thereon.

5. A conveyor belt system as in claim 1, wherein said lifting device comprises an inflatable pressure hose so constructed that inflation of said hose imparts a vertical force to said conveyor belt band carrier, and wherein said vertically imparted force is sufficient to raise the workpiece carrier and workpieces provided thereon.

6. A conveyor belt system as in claim 5, wherein said inflatable pressure hose is a pneumatic hose.

7. A conveyor belt system as in claim 5, wherein said inflatable pressure hose is a hydraulic hose.

8. A conveyor belt system as in claim 1, wherein said lifting device comprises an electromagnet.

9. A conveyor belt system for intermittently transporting and precisely arresting workpieces, comprising:

- a continuous conveyor belt band;
- an H-profile track comprising two upward facing shanks and a central fixed member, said upward facing shanks having upper surfaces adapted for engagement with the lower surface of a workpiece carrier;
- a conveyor belt band carrier positioned between said upward facing shanks of said H-profile track, said conveyor belt band carrier carrying and guiding said conveyor belt band;
- a lift device for vertically displacing said conveyor belt band carrier between a raised and a lowered position, said lift device disposed between said central fixed member of said H-profile track and said conveyor belt band carrier, wherein said lift device is a lift cylinder;
- a workpiece carrier provided on said conveyor belt; and
- two sidewalls connected to said upward facing shanks of said H-profile track for precise lateral guidance of the workpiece carrier;
- wherein said workpiece carrier is in frictional engagement with said conveyor belt band when said conveyor belt band carrier is displaced in the raised position, and wherein said workpiece carrier rests upon the upper surfaces of said upward facing shanks when the conveyor belt band carrier is displaced in the lower position.

10. A passive lift conveyor belt system for intermittently transporting and precisely arresting workpieces, comprising:

- a continuous conveyor belt band;
- an H-profile track comprising two upward facing shanks and a central fixed member, said upward facing shanks having upper surfaces adapted for engagement with the lower surface of a workpiece carrier;
- a conveyor belt band carrier positioned between said upward facing shanks of said H-profile track, said conveyor belt band carrier carrying and guiding said conveyor belt band;
- a lift device for vertically displacing said conveyor belt band carrier between a raised and a lowered position, said lift device disposed between said central fixed member of said H-profile track and said conveyor belt band carrier, wherein said lift device is a spring, wherein said spring lies on said central fixed member of said H-profile track and between said two upward facing shanks of the H-profile track, and wherein the spring pressure of said spring is adjusted to raise said workpiece carrier and a workpiece provided thereon to said upper position, and wherein during working said workpiece carrier is capable of being subjected to sufficient downward force to press the workpiece carrier onto said support surfaces, whereupon frictional engagement between the conveyor belt band and the workpiece carrier is insufficient to cause conveyance thereof;
- a workpiece carrier provided on said conveyor belt; and
- two sidewalls connected to said upward facing shanks of said H-profile track for precise lateral guidance of the workpiece carrier;
- wherein said workpiece carrier is in frictional engagement with said conveyor belt band when said conveyor belt band carrier is displaced in the raised position, and wherein said workpiece carrier rests upon the upper surfaces of said upward facing shanks when the conveyor belt band carrier is displaced in the lower position.

\* \* \* \* \*